United States Patent
Zanger

(10) Patent No.: US 9,024,247 B2
(45) Date of Patent: May 5, 2015

(54) DEVICE AND METHOD FOR REDUCING AMPLITUDE NOISE OF A LIGHT RADIATION

(71) Applicant: CryLaS Crystal Laser Systems GmbH, Berlin (DE)

(72) Inventor: Eckhard Zanger, Seddiner See (DE)

(73) Assignee: CryLaS Crystal Laser Systems GmbH, Berlin (DE)

( * ) Notice: Subject to any disclaimer, the term of this patent is extended or adjusted under 35 U.S.C. 154(b) by 129 days.

(21) Appl. No.: 13/942,569

(22) Filed: Jul. 15, 2013

(65) Prior Publication Data

US 2014/0014811 A1 Jan. 16, 2014

Related U.S. Application Data

(60) Provisional application No. 61/672,181, filed on Jul. 16, 2012.

(51) Int. Cl.
*H03G 3/20* (2006.01)
*G02F 1/03* (2006.01)
*H01S 3/00* (2006.01)

(52) U.S. Cl.
CPC ............ *G02F 1/03* (2013.01); *G02F 1/0322* (2013.01); *G02F 1/0327* (2013.01); *G02F 2203/52* (2013.01); *G02F 2203/60* (2013.01); *H01S 3/0085* (2013.01)

(58) Field of Classification Search
CPC ....................................................... G02F 1/03
USPC .................. 250/205, 238, 214 AG, 214 C
See application file for complete search history.

(56) References Cited

U.S. PATENT DOCUMENTS

| | | | | |
|---|---|---|---|---|
| 4,111,050 A | * | 9/1978 | Waddoups | 374/161 |
| 4,215,576 A | * | 8/1980 | Quick et al. | 374/161 |
| 4,581,730 A | * | 4/1986 | Ozeki et al. | 398/79 |
| 6,772,085 B2 | * | 8/2004 | Watkins et al. | 702/130 |

* cited by examiner

*Primary Examiner* — Seung C Sohn
(74) *Attorney, Agent, or Firm* — Klein, O'Neill & Singh, LLP

(57) ABSTRACT

The invention relates to a device for reducing amplitude noise of a light radiation, comprising a first birefringent crystal, which has a first length along a direction of light propagation as well as a first optical axis; a polarization device; a light sensitive element, arranged in such a way that at least a part of a beam of light radiating through the first crystal and the polarization device when the device is in operation strikes the light sensitive element; and a control appliance which stands in operative connection with the first crystal and which is provided and arranged for using a signal generated by the light sensitive element as input variable and for applying a voltage signal as output signal to the first crystal to compensate for the amplitude noise. For the temperature control of the first crystal a temperature control appliance is provided which stands in operative connection with the control appliance and which is provided and arranged for using the voltage signal of the control appliance as input variable and for setting the temperature of the first crystal depending on the input variable of the temperature control appliance.

21 Claims, 3 Drawing Sheets

DEVICE AND METHOD FOR REDUCING AMPLITUDE NOISE OF A LIGHT RADIATION

CROSS-REFERENCE TO A RELATED APPLICATION

This application claims the benefit of U.S. Provisional Application No. 61/672,181, filed on Jul. 16, 2012, the disclosure of which is incorporated by reference herein.

BACKGROUND

The invention relates to a device for reducing amplitude noise of a light radiation as well as to a method for reducing amplitude noise of a light radiation.

Optical noise reducers, also known to a person skilled in the art under the English technical term "noise eater", are known from prior art in various embodiments and are being used in various ways in optical technology.

Laser radiation is generally full of undesirable amplitude noise (also referred to as intensity noise or power noise), wherein the noise can extend over a wide frequency range of below 1 Hz up into the GHz range.

A noise reducer known from prior art represents a combination of a laser beam modulator, a light detector and an electronic controller, said controller holding constant the light intensity at the exit of the arrangement by compensating for the changes of intensity registered by the light detector by means of an opposed modulation of the light wave. A photodiode is generally used as light detector because even intensity fluctuations of very high frequencies can be registered with this. An electro-optical modulator or an acousto-optical modulator is generally used as laser beam modulator.

With an electro-optical modulator, also referred to as Pockets cell, the amplitude of a laser beam can be altered, that is modulated, almost without delay with the help of an electric signal. For this purpose, the beam of light to be modulated, which is polarized linearly or has been polarized with the help of a polarizer, runs through one or multiple non-linear crystals which have a linear electro-optical effect. A beam of light running through a non-linear crystal is split into an ordinary partial beam and an extraordinary partial beam. The crystals are furnished with electrodes so that an electrical field can be produced inside of the crystals by applying an electric voltage. Due to the linear electro-optical effect the refraction indices $n_o$ for the ordinary partial beam and $n_e$ for the extraordinary partial beam change.

Upon exiting a crystal arrangement the partial beams reunite to form one beam of light having an altered polarization state compared to the incident beam. Thereafter, the beam regularly runs through a so-called analyzer, that is to say a polarizer, which suppresses a polarization component.

By altering the applied electrical field the polarization state of the light wave can in front of the analyzer be changed continuously between unaltered polarization, circular polarization and linear polarization rotated by 90 degrees. The beam exiting the analyzer is again linearly polarized with an amplitude that is altered compared to the incident beam.

The voltage change needed to change the amplitude from minimal to maximum value is referred to as half-wave voltage $U_{\lambda/2}$. The transmittance T of the modulator as function of the voltage applied U is specified roughly by the function of the subsequent equation I:

$$T(U) = \cos^2\left(\frac{\pi(U - U_0)}{2U_{\lambda/2}}\right) \quad \text{(I)}$$

Here, the offset voltage $U_0$ is the voltage needed for maximum transmittance. The transmittance of the modulator can hence by variation of the applied voltage between $U_0$ and $U_{max} = U_0 + U_{\lambda/2}$ theoretically be varied between 0% and 100%.

In a noise reducer the amplitude of the transmitted beam of light is held constant with the help of a controller, in that the voltage applied to the modulator is varied correspondingly. Depending on the setting of the set value, the voltage applied to the modulator then varies around an operating point $U_s$.

In the longitudinal electro-optical modulation the electrical field is aligned parallel to the direction of propagation of the light. In this arrangement it is viewed as advantageous that the occurrence of natural birefringence, causing a strong temperature dependence of the modulator, can be avoided. In contrast, the transversal electro-optical modulation offers the advantage that the half-wave voltage needed is lower when a suitable crystal length is chosen. But then there is in this case a generally undesirable natural birefringence, that is, the crystal alters the polarization state of the beam of light even without an electrical field being applied.

Since the refraction indices $n_o$ and $n_e$ of the crystals possess different temperature coefficients, the polarization state of the light and consequently the amplitude of the beam of light exiting the polarizer become temperature dependent. In order to avoid this, usually pairs of crystals of the exact same length are used, arranged one after the other, the optical axes of which are rotated by 90 degrees against each other, so that the natural birefringence of the first crystal is compensated for by that of the second crystal. Thereby, the temperature dependence of the modulator can largely be avoided. Typically, crystals are manufactured with a length tolerance of about 0.1 mm. Due to the selection of two crystals well synchronized with respect to their length, often crystals are employed which differ in length only by some 10 μm. Within the scope of the present invention this is understood to be "of the same length".

In the semiconductor industry noise reducers are often employed to reduce the noise of laser radiation in inspection systems. Increasingly higher demands are nowadays placed on the life-span of all of the components of such inspection systems, 20 000 to 40 000 hours in continuous operation (24 hours per day at 7 days a week) are common. This requirement can hardly be fulfilled by the hitherto conventional noise reducers having an electro-optical modulator. As it is known from the literature (see for example M. N. Satyanarayan and H. L. Bhat: "Electrical and Optical Characterisation of Electrochromic Damages in KTP Single Crystals", Journal of the Korean Physical Society, 32 (1998), pages p 420-p 423), birefringent crystals which are permanently exposed to an electrical DC field show an optical transparency declining over time. The effect, also visually perceptible as gray discoloration, is referred to as "electro-chromatism". It occurs especially strongly in materials having a high ion conductivity, which is why an impairment of the crystal lattice by migration of ions seems likely as cause.

A material having high ion conductivity is for example potassium titanyl phosphate ($KTiOPO_4$, KTP). Even with lower electrical field strengths, as they are common in electro-optical modulators, within minutes this crystal shows gray discolorations, which make it entirely unusable. In contrast, the effect does not occur when merely alternating fields are applied to the crystal. Hence, this crystal is not suitable for application in a standard noise reducer in which in addition to an AC voltage portion a resulting DC voltage portion and consequently a resulting DC field are also always present.

Other crystals have considerably lower ion conductivities and can hence be used in a noise reducer over a longer time period depending on the used field strength. With the use of especially long crystals and accordingly lower field strengths needed the life-span can be increased, however, the maximum lengths are restricted by the manufacturing processes available today. Hence, even with these crystals the life-span required in the semiconductor industry cannot be ensured.

SUMMARY

An object underlying the present invention is to specify a noise reducer having a longer life-span than noise reducers known from prior art.

A device for reducing amplitude noise of a light radiation according to an exemplary embodiment of the invention, which can in short also be referred to as noise reducer, has a first birefringent crystal. The first birefringent crystal has a first length along a direction of light propagation and has a first optical axis. Furthermore, in direction of light propagation a polarization device (polarizer) is arranged behind the first crystal. The polarization device serves as analyzer. The combination of the first crystal and the polarizer can also be referred to as electro-optical modulator.

Furthermore, a noise reducer according to the invention has a light sensitive element, arranged in such a way that at least a part of a beam of light radiating through the first crystal and the polarization device when the device is in operation strikes the light sensitive element. For example, a partial beam, to be directed onto the light sensitive element, can be directed onto the light sensitive element through a partially transmitting optical element such as for instance a beam splitter.

Furthermore, a control appliance is provided which is connected to the first crystal and serves the purpose of using a signal generated by the light sensitive element as input variable and of putting out a voltage signal as output signal to compensate for the amplitude noise of the light radiation. This output signal is applied to the first crystal via a corresponding connection.

According to the invention, a temperature control appliance is provided, serving to control the temperature of the first crystal. In contrast to solutions known from prior art the temperature dependence of the birefringent crystal is therefore not compensated for by a second birefringent crystal of the same length. The temperature control appliance is connected to the control appliance and serves the purpose of using the voltage signal provided as output signal by the control appliance as input variable and of setting the temperature of the first crystal depending on said input variable of the temperature control appliance. In addition to the control appliance connected to the light sensitive element, this regulated and controlled temperature control appliance therefore represents a further control mechanism in the noise reducer claimed.

A device for reducing amplitude noise of a light radiation, configured in such a way, can when in operation be employed in such a way that voltages, applied to the first crystal by the control appliance to balance an amplitude noise, are compensated for again in the further course of operation by a temperature adjustment so that the voltage applied to the first crystal is at 0 volt on average over time. That is to say, the first crystal is preferably only loaded with an AC voltage by the noise reducer according to the invention, which considerably increases its life-span and consequently that of the entire device. The specific correlations of the individual physical variables and the specific mode of action of the device according to the invention will yet be explained further below.

The noise reducer can be employed especially advantageously for reducing amplitude noise of a laser light radiation, particularly of a monochromatic laser beam.

In an exemplary variant not only a single birefringent crystal is employed. Rather, the device preferably comprises a second birefringent crystal, wherein the number of birefringent crystals is basically not restricted upwards. The second birefringent crystal has a second length along the direction of light propagation and has a second optical axis. In direction of light propagation it can be arranged in front of or behind the first crystal. In any case, it is arranged in front of the polarization device. The first birefringent crystal here has a length different from the second birefringent crystal. In other words, in this variant the natural birefringence is—in contrast to the solutions known from prior art—precisely not compensated for due to the different lengths of the crystals.

When only one crystal is employed, its transmittance dependence on the temperature and on the voltage cannot be set separately. Whereas, with two or more crystals the sum of the crystal lengths determines the height of the half-wave voltage; said half-wave voltage drops when the crystal length increases. The difference between the lengths of the crystals determines the temperature dependence of the transmittance; said temperature dependence rises when the difference increases.

It is for example conceivable that multiple crystals of the same length are arranged one after the other in alignment with each other. These crystals then behave like a single longer crystal. When, for example, a crystal length of 40 mm is desired, it is recommendable to arrange two crystals with a length of 20 mm consecutively, because crystals with a length of up to 20 mm can—unlike longer crystals—be manufactured relatively easily.

It is for example also conceivable to arrange two crystals of the same length (thus being compensated regarding the temperature dependence of their transmittance properties) one after the other, wherein the optical axes of these crystals should not lie parallel to each other so that they act as two different crystals. Now, a shorter crystal (for example with a length of 2 mm) could also be arranged behind, in front of or between the crystals of the same length, wherein the optical axis of the shorter crystal is aligned equal to the optical axis of one of the other two crystals. In effect then, the length of the shorter crystal adds up to the length of the longer crystal of the same orientation so that in terms of effect the three crystals behave like two crystals. In such an arrangement only the temperature of the shorter crystal needs to be controlled in order to be able to make use of the advantageous modification of the voltage signal required for noise reduction. This makes possible faster temperature adjustments than when the temperatures of larger crystals have to be controlled.

Preferably, the control appliance also stands in operative connection with the second crystal. Alternatively or additionally, it is preferably provided that the temperature control appliance is also provided to control the temperature of the second crystal to, when in operation, also set the temperature of the second crystal depending on the input variable of the temperature control appliance. Preferably, the temperature control appliance here controls the temperature of the first crystal and the second crystal simultaneously and in equal measure, so that both crystals always have the same temperature.

The connection of the voltage signal to the first crystal and the second crystal is preferably executed in such a way that the effects of the voltage signal on the first and on the second crystal onto the change of polarization of the light radiation are strengthened.

In an exemplary variant no further birefringent crystals are present in the noise reducer apart from the first and the second crystal. In this variant the temperature control appliance is provided to control the temperature of the first crystal and of the second crystal.

In a further exemplary variant the device has in the optical path in front of the polarization device at least one further birefringent crystal. This at least one further birefringent crystal can have the same length as the first or as the second crystal. However, the further crystal can also have a length different from the first length and from the second length. Independent of its length, an optical orientation analogous to the first or to the second crystal is recommendable in order to be able to profit from the above explained advantages of dividing a crystal unit, a unit in terms of effect, into more than one crystal. The at least one further crystal can be put in operative connection with the temperature control appliance. Furthermore, preferably it stands in operative connection with the control appliance.

Preferably, the temperature control appliance is provided and arranged for the purpose of setting the temperature of the first crystal and/or of the second crystal (and, where applicable, a further crystal), when the device is in operation, in such a way that the voltage signal of the control appliance averages out at zero over time. As explained above, this increases the life-span of the crystals.

In an exemplary variant the first crystal and/or the second crystal (and, where applicable, the further crystal) have electrodes by means of which the (electro-conductive) connection to the control appliance can be established. Thereby, it is possible in an especially simple manner that the control appliance can transfer electric signals onto the first crystal and/or onto the second crystal.

In an exemplary variant the electrodes are in each case designed as a metal coating, arranged on those surfaces of the crystals which are arranged perpendicular to the first optical axis (insofar as the first crystal is concerned) or perpendicular to the second optical axis (insofar as the second crystal is concerned). These surfaces are also referred to as z-surfaces. Preferably, the electrodes are here arranged on those surfaces of the first crystal and/or of the second crystal which run parallel to the direction of light propagation.

Preferably, the first optical axis of the first crystal and/or the second optical axis of the second crystal are aligned perpendicular to the direction of light propagation. By such a transversal arrangement of the optical axes of the first crystal and of the second crystal in relation to the beam of light radiating through them when the device is in operation, it is not required to work with transparent electrodes.

Independent of the concrete embodiment of the device for reducing amplitude noise of a light radiation, suitable crystal materials are, among others, potassium dihydrogen phosphate ($KH_2PO_4$; KDP), potassium dideuterium phosphate ($KD_2PO_4$; KD*P), lithium niobate ($LiNbO_3$) and beta barium borate ($\beta$-$BaB_2O_4$; BBO).

Preferably, linearly polarized light is radiated into the noise reducer to decrease its amplitude noise. In an embodiment the first optical axis of the first crystal and/or the second optical axis of the second crystal are aligned at an angle of more than 0° and less than 90° against the direction of polarization of the corresponding beam of light. This can for example be accomplished in that a beam of light, the amplitude noise of which shall be reduced, has to radiate through a polarizer before it can strike the first crystal. Usually, however, the beam of light is already linearly polarized when it strikes the noise reducer, so that this additional polarizer is not necessarily needed. Suitable angles at which the first optical axis of the first crystal and/or the second optical axis of the second crystal are aligned to the direction of polarization of the beam of light lie in the range of 15° to 75°, particularly of 30° to 60°, particularly of 40° to 50° and very particularly at about 45°.

Preferably, the first optical axis of the first crystal and the second optical axis of the second crystal essentially stand perpendicular to each other. In this manner it can be attained that the natural birefringence of the one crystal compensates for the natural birefringence of the other crystal to a predetermined degree corresponding to their length, but the electro-optical effects add up.

Especially preferred is an arrangement in which both the first optical axis and the second optical axis are rotated by about 45° against the direction of polarization of an incident beam of light and here essentially stand perpendicular to each other.

Preferably, the first length and the second length differ from each other by 0.2 mm or more, particularly by 0.5 mm or more, particularly by 1 mm or more, particularly by 1.5 mm or more and very particularly by 2 mm or more. Thereby, it is in an especially advantageous manner ensured that the birefringent properties of the first crystal and the second crystal do not completely cancel each other out and a temperature dependence of the birefringence properties of the first crystal and of the second crystal persists. This is undesirable according to the solutions known from prior art.

In a further exemplary variant the noise reducer is equipped with an additional AC voltage source to allow for a phase modulation of a beam of light radiating through the device when in operation. In a phase modulation a change over time of the phasing of the wave fronts is imparted on the light wave. This kind of modulation is used in laser technology, among others, to stabilize laser resonators by means of electronic control loops. By applying an AC voltage to the crystal the optical path length of the crystal can be modulated, whereby ultimately the phase of the transmitted light wave is modulated. The AC voltage source is in a preferred embodiment connected to the first crystal and the second crystal in such a way that when the device is in operation an AC voltage signal produced by the AC voltage source is fed into the first crystal and into the second crystal. The phase of the signal fed into the second crystal is here shifted by 180° to the phase of the signal fed into the first crystal. That is to say, the signal fed into the second crystal is in antiphase compared to the signal fed into the first crystal. This can be realized by a corresponding circuit. Applying such an AC voltage to the first crystal and to the second crystal leads to the modulation of the optical path length of the crystals. This leads to the modulation of the phase of the transmitted light wave, therefore of the beam of light radiating through the device when in operation. Such a phase modulation can then be put into practice especially advantageously, when the optical axes of the birefringent crystals are aligned in relation to the direction of polarization of the incident beam of light in such a way that no splitting of the beam of light into an ordinary and an extraordinary partial beam takes place. For then, the beam of light propagates in the crystal either as a pure ordinary or as a pure extraordinary partial beam.

As a consequence of the antiphase feed-in of the AC voltage signal the phase modulation does not cause an accompanying amplitude modulation of the beam of light. For such an accompanying amplitude modulation would represent an undesirable contribution to the amplitude noise and would run counter to the intended use of the noise reducer. With the help of an AC voltage signal made available in such a way, a phase modulation with a frequency in the high-frequency range becomes possible.

In an exemplary embodiment the AC voltage source is connected to a primary winding of a transformer, while a secondary winding of this transformer forms an oscillating circuit with a capacitor and in this manner is connected to the first crystal and the second crystal. This embodiment has the advantage that no direct contact is established between the (high voltage) AC voltage source and sensitive parts of the noise reducer.

In a further exemplary variant the connection of the AC voltage source to the noise reducer is done in such a way that the quotient from the amount of the amplitude of the AC voltage signal $U_1$ applied to the first crystal when in operation and the amount of the amplitude of the AC voltage signal $U_2$ applied to the second crystal when in operation is proportional to the quotient from the second length $L_2$ and the first length $L_1$. In other words, the following equation II shall be satisfied:

$$\frac{U_1}{U_2} \propto \frac{L_2}{L_1} \qquad (II)$$

When the feed-in of the AC voltage signal is in antiphase, that is, when the AC voltage signal is fed in shifted in phase by 180°, the proportionality factor amounts to −1, so that the following equation III is preferably satisfied:

$$\frac{U_1}{U_2} = -\frac{L_2}{L_1} \qquad (III)$$

When in an application both an amplitude modulation and a phase modulation of a beam of light is needed, generally two separate instruments are employed in solutions known from prior art, because an amplitude modulator is not able to perform a phase modulation and vice versa. Hence, the previously specified variant in such a case allows for the saving of costs, for now one instrument can be eliminated.

A method for reducing the amplitude noise of a light radiation according to an exemplary embodiment of the invention has the subsequently explained steps.

First, a light radiation is radiated in a direction of light propagation onto a device for reducing amplitude noise. Preferably, it is a device according to the preceding explanations. The light radiation here radiates first through a first birefringent crystal having a first length along the direction of light propagation as well as a first optical axis. Thereafter, the beam of light radiates through a polarization device and then at least partly strikes a light sensitive element.

Now, depending on the amplitude of the light radiation striking the light sensitive element, a signal is produced by means of the light sensitive element. This signal is used as input variable of a control appliance. In the control appliance the signal is modified to produce a modified output signal. This modified output signal is then applied to the first crystal. The above explained steps are preferably carried out in the sequence in which they were explained.

The method is characterized in that in addition to these steps the subsequently explained steps are carried out. So, a desired transmittance of the device for reducing amplitude noise is defined as operating point. This definition preferably takes place as first step of the process, that is, before radiating the light radiation, the amplitude noise of which shall be reduced.

Furthermore, by means of a temperature control appliance, the temperature of the first crystal is set to such a temperature at which the voltage required to attain the transmittance determined as operating point essentially amounts to 0 volt. This setting of the temperature preferably likewise takes place before radiating the light radiation, the amplitude noise of which is to be reduced, is begun. The transmittance of the device depending on the temperature of the first crystal as well as on the voltage applied to this crystal will yet be explained further below.

Furthermore, in the scope of the method claimed according to the invention, the temperature control appliance is, when the device is in operation, depending on the voltage of the modified output signal applied to the first crystal, regulated and controlled in such a way that that voltage which is required to attain the transmittance determined as operating point essentially amounts to 0 volt on average over time. This controlling of the temperature control appliance preferably takes place continuously during the running operation of the device. When the voltage applied to the crystal essentially amounts to 0 volt on average over time, this means that essentially merely an AC voltage signal is applied to the crystal. This prevents the above-explained effect of the electro-chromatism, so that the life-span of the first crystal and consequently the life-span of the device employed for the method significantly increases.

Preferably, the beam of light radiates through a second birefringent crystal, having a second length along the direction of light propagation as well as a second optical axis, before striking the polarization device. The modified signal is here preferably applied to the second crystal also. Furthermore, preferably also the temperature of the second crystal is set analogous to the temperature of the first crystal. Finally, the temperature control appliance is preferably controlled depending on the voltage of the modified signal applied to the first crystal and to the second crystal.

Controlling the temperature control appliance preferably takes place in such a way that the temperature of the first crystal and/or of the second crystal, when the device is in operation, is modified to bring the voltage required to attain the transmittance determined as operating point of the device to a value, which in terms of the absolute value of its amplitude corresponds to the voltage of the modified signal but has a reversed sign. This can preferably be attained in that the temperature control appliance uses the output signal produced by the control appliance as input signal. For then, an online adjustment of the voltage to be applied to the first crystal and to the second crystal can take place with the help of the temperature control appliance, which in an especially simple manner leads to attaining a time average value of 0 volt of the voltage applied to the first crystal and to the second crystal.

In an exemplary embodiment of the method, additionally, a phase modulation of the beam of light radiating through the device for reducing its amplitude noise takes place.

The phase modulation here preferably takes place without substantial amplitude modulation of the beam of light. In this manner the efficiency of the noise reducing method is not decreased by the additional phase modulation.

Preferably, an AC voltage signal employed for the phase modulation is fed into the second crystal in antiphase (that is, shifted in its phase by 180°) compared to the feed-in into the first crystal. By this feed-in in antiphase it is in an especially simple manner attained that the phase modulation is executed without amplitude modulation.

Preferred embodiments of the device are in an analogous manner transferrable onto the method and vice versa.

BRIEF DESCRIPTION OF THE DRAWINGS

Further advantages and details of the present invention shall be further explained with the help of figures and corresponding exemplary embodiments.

DETAILED DESCRIPTION

Figure 1:
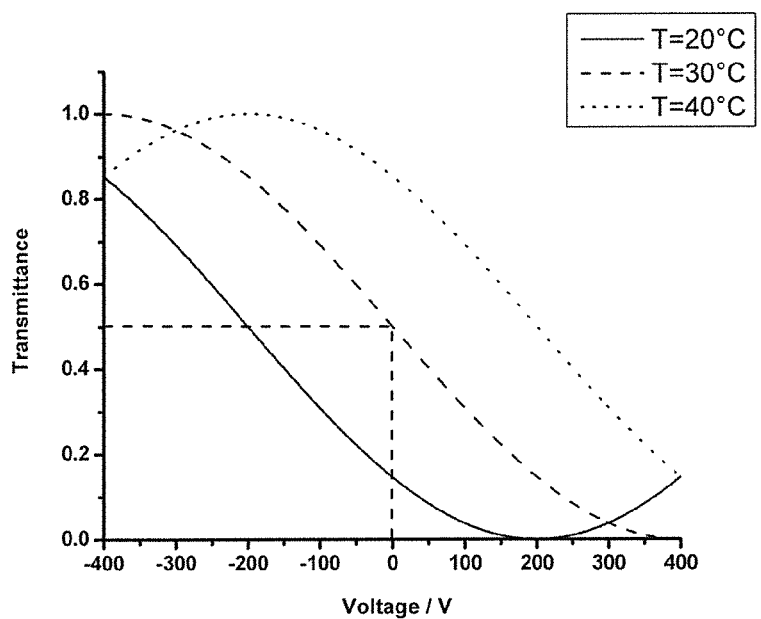
FIG. 1 shows a graphic illustration of the dependence of the transmittance on the voltage and the temperature.

FIG. 1 shows an exemplary graphic illustration of the dependence of the transmittance of a noise reducer or an electro-optical modulator (taking into account all components such as crystals, polarizers etc.) on the temperature and the voltage. As can be seen from FIG. 1, both the temperature and the voltage have a crucial influence on the transmittance of the noise reducer.

By selecting suitable temperature and voltage ranges, an operating point can be defined at which a desired transmittance at a desired voltage can be set. In FIG. 1 a transmittance of 0.5 as well as a voltage of 0 volt was chosen as operating point. As can be seen from the graphic illustration, these criteria are attained when the temperature of the first crystal and of the second crystal is at 30° Celsius. It is to be taken into account herein that the temperature of other optical elements such as, for instance, polarizers has no substantial influence on the transmittance. A corresponding temperature dependence exists essentially merely referring to the crystals of a noise reducer. Insofar as a voltage of 0 volt on average over time to be applied to the crystals of the noise reducer is desired, a desired transmittance rate can be set by selecting a temperature. Here—as evident from FIG. 1—the rule applies that the higher the temperature of the crystals of the noise reducer the greater the transmittance. This can be different with some crystal materials.

When a transmittance of 0.5 is selected as operating point, the voltage to be applied to the crystals can be varied by alteration of the temperature in order to remain at this operating point. By increasing the temperature of the crystals, for example, a slightly higher voltage than 0 volt has to be applied to the crystals in order to keep obtaining a transmittance of 0.5. Whereas, when the temperature is lowered a voltage slightly lower than 0 volt is sufficient to maintain the transmittance of 0.5. In this manner, with a defined operating point a different voltage to be applied to the crystals can be determined by varying the temperature of the crystals of the noise reducer.

Figure 2:
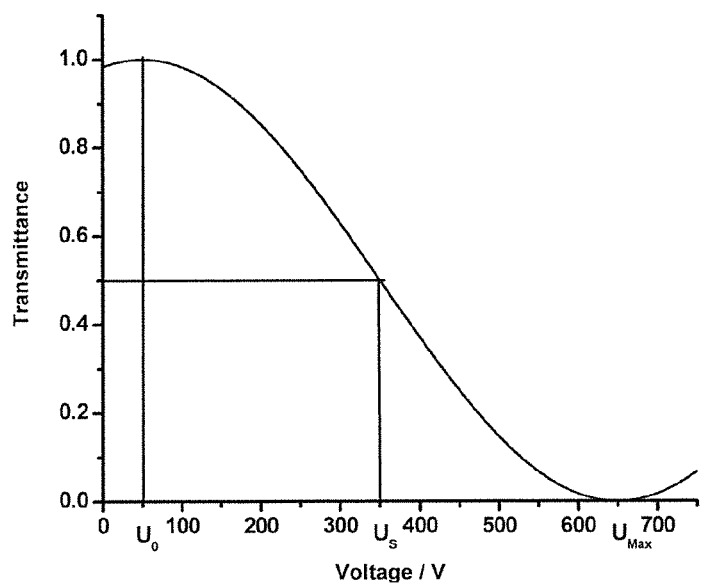
FIG. 2 shows a graphic illustration of the dependence of the transmittance on the voltage.

FIG. 2 is an exemplary graphic illustration to make clear the dependence of the transmittance on the voltage applied to the crystals of a noise reducer. As already explained at the beginning, the transmittance of a noise reducer comprising an electro-optical modulator can be varied by variation of the applied voltage between the offset voltage $U_0$ and the maximum voltage $U_{max}$. The maximum voltage is calculated from the sum of the offset voltage $U_0$ and the half-wave voltage $U_{\lambda/2}$. In a noise reducer the amplitude of the transmitted beam of light is regularly held constant with the help of a controller, in that the voltage applied to the modulator or to its crystals is varied correspondingly. Depending on the setting of the set value desired as transmittance, the voltage applied to the modulator then varies around an operating point $U_S$. In the solutions known from prior art it is not provided to set this operating point $U_S$ to a voltage value of 0 volt. However, in the method claimed according to the invention this is the case.

Figure 3:
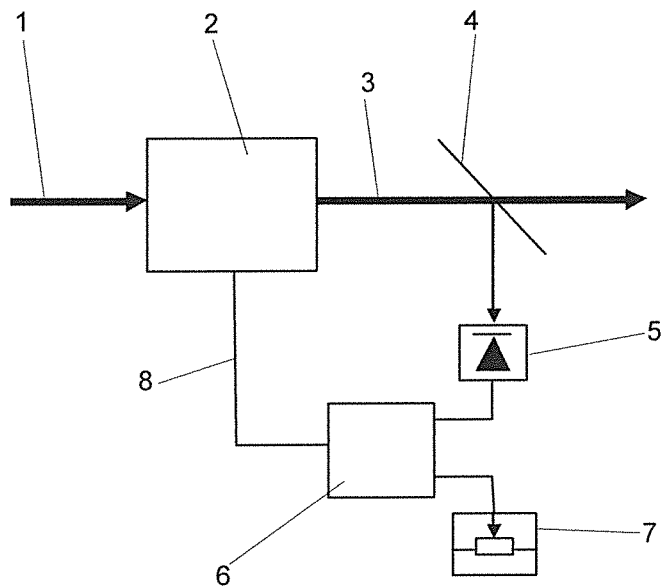
FIG. 3 shows an arrangement of a noise reducer known from prior art.

FIG. 3 shows an example of a noise reducer known from prior art. A beam of light 1 of a laser light radiation, the noise of which is to be reduced, is here directed onto an electro-optical modulator 2. The beam of light 1 leaves the electro-optical modulator 2 as a modulated beam of light 3 and thereby strikes a beam splitter 4. A small part of the modulated beam of light 3 is directed onto a photodiode 5 as light sensitive element by the beam splitter 4. The photodiode 5 is connected to an electronic control appliance 6. Moreover, a set value generator 7 is connected to this electronic control appliance 6. The electronic control appliance 6 now compares the set value determined by the set value generator 7 with the signal of the light intensity detected by the photodiode 5. Depending on the detected light signal the electro-optical modulator 2 is then supplied with a voltage signal 8 to influence the transmittance of the modulator 2 (compare the general physical correlation between transmittance and voltage illustrated in FIG. 2).

When a light intensity that is too high has been detected by the photodiode 5, the transmittance of the electro-optical modulator 2 is slightly lowered. Whereas, when a light intensity lying below a determined set value has been detected by the photodiode 5, the transmittance of the electro-optical modulator is slightly increased. In this manner, intensity fluctuations of the beam of light 1, caused by amplitude noise, are balanced in the modulated beam of light 3, so that ultimately a modulated beam of light having a low amplitude noise is obtained.

Figure 4:
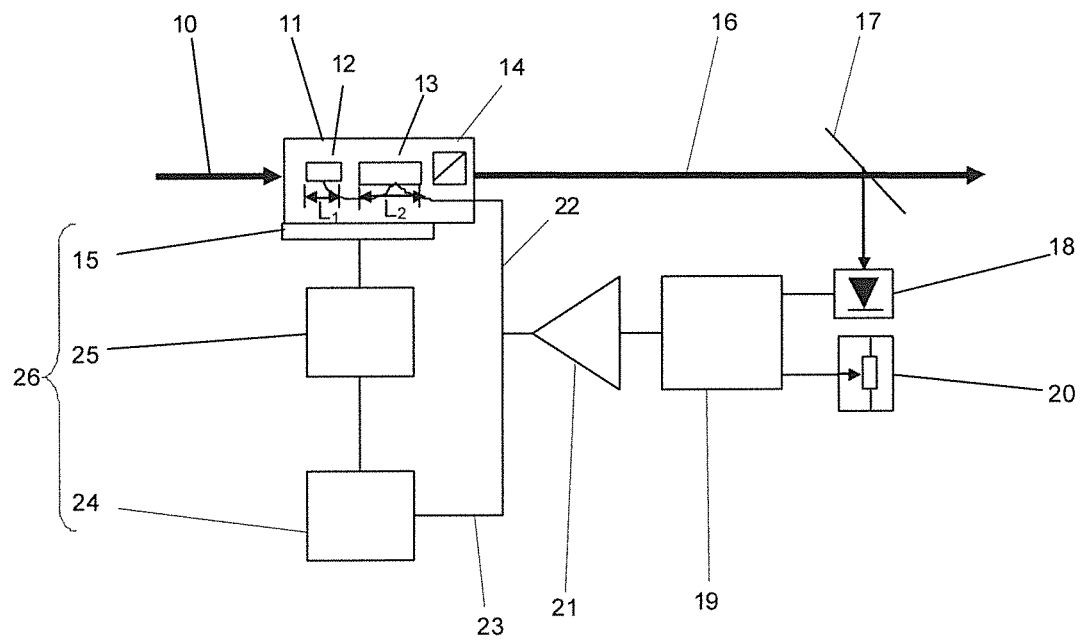
FIG. 4 shows a schematic circuit diagram of an exemplary embodiment of a noise reducer.

FIG. 4 shows an exemplary embodiment of a noise reducer having a considerably greater life-span compared to the noise reducer illustrated in FIG. 3, because it has an electronic circuitry counteracting an electro-chromatism of the employed crystals.

The noise reducer of FIG. 4 is provided so that a beam of light 10, preferably polarized linearly, strikes an electro-optical modulator 11. This electro-optical modulator 11 consists of a first crystal 12, a second crystal 13 and a polarizer 14, arranged one after the other in the direction of light propagation of the beam of light 10. The first crystal 12 is a birefringent crystal having a first length $L_1$. The second crystal 13 likewise is a birefringent crystal having a second length $L_2$ which differs from the first length $L_1$. The electro-optical modulator 11 is moreover equipped with a Peltier element 15 serving to control the temperature of the first crystal 12 and of second crystal 13. The beam of light 10 leaves the electro-optical modulator 11 as a modulated beam of light 16 and thereby strikes a beam splitter 17. The greatest portion of the modulated beam of light 16 moves past the beam splitter 17. A small portion, however, is directed onto a photodiode 18 as light sensitive element. The signal produced by the photodiode 18 depending on the amplitude of the portion of the modulated beam of light 16 that is directed onto it serves as input variable of a PID controller 19 serving as control appliance. Moreover, a set value generator 20 is connected to the PID controller 19. The PID controller 19 now compares the signal of the photodiode 18 with the signal of the set value generator 20 and from this forms a control signal which it transfers onto a high voltage amplifier 21. In the high voltage amplifier 21 the control signal is amplified and is made available as bipolar output voltage. This bipolar output voltage is applied to the first crystal 12 and to the second crystal 13 via a connecting line 22. In this manner a control circuit is closed, serving to activate the electro-optical modulator 11 and causing a modulation of the beam of light 10 into the modulated beam of light 16 taking place in real time.

A light intensity of the modulated beam of light 16 which is too high due to amplitude noise is balanced by a decreasing of the transmittance of the electro-optical modulator 11. A light intensity of the modulated beam of light 16 that is lower as a consequence of amplitude noise is balanced by increasing the transmittance of the electro-optical modulator 11. As a result, the modulated beam of light 16 has a roughly steady amplitude having a very low amplitude noise.

Now, to ensure that the life-span of the first crystal 12 and of the second crystal 13 is higher than in noise reducers known from prior art, an additional regulation of the temperature of the first crystal 12 and of the second crystal 13 takes place by means of the Peltier element 15. For this purpose the bipolar output voltage of the high voltage amplifier 21 is applied to an integral controller (integrating controller) 24 via a second connecting line 23. The integral controller 24 is executed with a fixed set value of 0 volt. That is to say, its output signal is measured depending on the bipolar input signal in such a way that the voltage applied to the first crystal 12 and to the second crystal 13 amounts to 0 volt on average over time.

For this purpose, the integral controller 24 is connected to a temperature controller 25. The temperature controller 25 is planned for the purpose of controlling the Peltier element 15 depending on the output signal of the integral controller 24 to cause an increase or a lowering of the temperature of the first crystal 12 and of the second crystal 13. The integral controller 24, the temperature controller 25 and the Peltier element 15 represent a temperature control appliance 26 here.

As evident from FIG. 1, increasing or lowering the temperature of the first crystal 12 and of the second crystal 13 leads to the voltage to be applied to the two crystals becoming higher or lower when the transmittance of the electro-optical modulator 11 shall be held steady. When the AC voltage signal produced by the high voltage amplifier 21 and applied to the first crystal 12 and to the second crystal 13 is positive, the superordinate control circuit consisting of the bipolar output voltage, the second connecting line 23 and the temperature control appliance 26 makes sure that the temperature of the first crystal 12 and of the second crystal 13 is slightly lowered. For then a slightly negative voltage has to be applied to the first crystal 12 and to the second crystal 13 to attain a steady transmittance of the electro-optical modulator. The absolute value of this negative voltage to be applied essentially corresponds to the previously applied positive voltage. On average over time, the first crystal 12 and the second crystal 13 are hence supplied with a voltage of 0 volt. Thereby, the disadvantages of an electro-chromatism explained above are avoided.

By choosing the crystal lengths $L_1$ and $L_2$ the temperature and voltage dependence of the transmittance of the electro-optical modulator can be set independent of each other. The greater the chosen overall length $L_1 + L_2$ of the first crystal 12 and the second crystal 13, the smaller becomes the required half-wave voltage $U_{\lambda/2}$. The greater the difference in length $L_1 - L_2$: the greater becomes the temperature dependence. Preferably, hence, the greatest possible overall length of the two crystals 12, 13 is chosen that is still compatible with regard to the costs required thereby and with the available space. In turn, the difference in length is chosen to be as small as possible, so as not to obtain an unnecessarily great temperature dependence which could make the system sensitive to changes of the ambient conditions. Of course, when selecting the first length $L_1$ and the second length $L_2$ as well as their difference in length it has to be made sure that the temperature range in which the electro-optical modulator 11 is operated lies within the temperature range approved for the crystal material.

As opposed to prior art in which to avoid a temperature dependence, if possible, one works with crystals of the same length, the presently explained invention and also the exemplary embodiment of FIG. 4 focus precisely on making use of this temperature dependence in order to increase the life-span of the first crystal 12 and of the second crystal 13.

The first connecting line 22 is connected to the first crystal 12 and to the second crystal 13 in such a way that the transversal electro-optical effects of the two crystals 12, 13 add up and the temperature dependence of the natural birefringence is partially compensated for. The polarizer 14 at the exit of the electro-optical modulator 11 removes the undesirable polarization component from the beam of light already modulated, so that the modulated beam of light 16 exiting the electro-optical modulator 11 has only one single polarization component.

Figure 5:
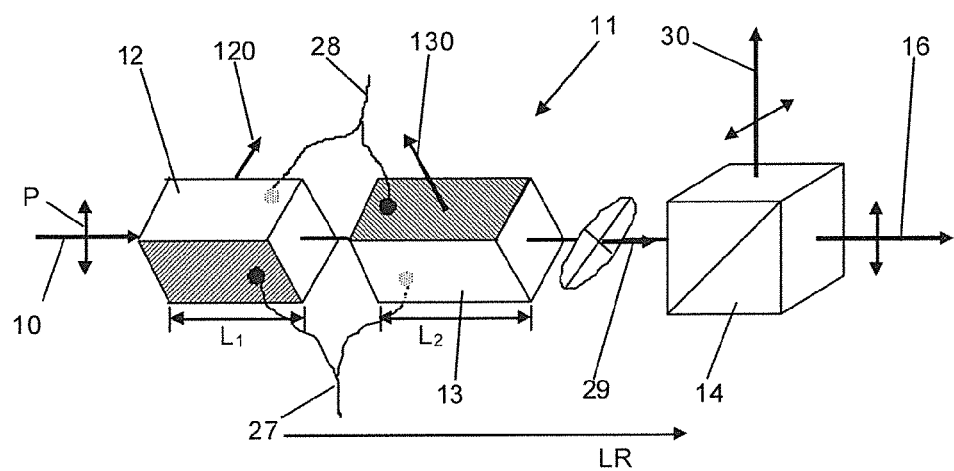
FIG. 5 shows a schematic detailed view of an exemplary embodiment of a noise reducer.

FIG. 5 shows an exemplary embodiment of an electro-optical modulator 11 which can be employed in the noise reducer of FIG. 4. However, the exemplary embodiment of FIG. 4 is not restricted to the electro-optical modulator 11 of FIG. 5.

The electro-optical modulator 11 of FIG. 5 is provided for employing linearly polarized light of a beam of light 10. In the exemplary embodiment of FIG. 5 this light is polarized vertically (in the paper plane). This is illustrated by a corresponding double arrow P. For the sake of convenience the same reference signs are used for the parts of the electro-optical modulator 11 illustrated in FIG. 5 as for the corresponding parts of the electro-optical modulator 11 of FIG. 4.

So, the linearly polarized beam of light 10 first strikes a first crystal 12. The optical axis 120 of the first crystal 12 is turned by 45° against the direction of polarization P of the incident beam of light. It points up diagonally backwards in the illustration of FIG. 5. The optical axis 120 of the first crystal 12 is here orientated perpendicular to the direction of light propagation LR. After the beam of light 10 has exited the first crystal 12 it enters a second crystal 13. The optical axis 130 of the second crystal 13 is rotated by 90° against the optical axis 120 of the first crystal 12. It points up diagonally forwards and is likewise rotated by 45° against the direction of polarization P of the incident beam of light. It likewise stands perpendicular to the direction of light propagation LR. As a consequence of this alignment of the optical axis 120 of the first crystal 12 and the optical axis 130 of the second crystal 13 the natural birefringence of the two crystals 12, 13 partially compensates for each other. However, in order to avoid a complete compensation of the natural birefringence, the first length $L_1$ of the first crystal 12 and the second length $L_2$ of the second crystal 13 are different from each other. The z-surfaces of the first crystal 12 and of the second crystal 13, standing perpendicular to the optical axes 120, 130, serve as electrodes and are furnished with a corresponding metal coating. A suitable material for forming the metal electrode on the z-surfaces of the first crystal 12 and of the second crystal 13 is gold. This is indicated in FIG. 5 by a corresponding hatching. Here, in the illustration of FIG. 5 only one z-surface of the first crystal 12 and only one z-surface of the second crystal 13 can be seen. The other z-surface of the first crystal 12 is orientated backwards, while the second z-surface of the second crystal 13 is orientated downwards. On both z-surfaces of the first crystal 12 and both z-surfaces of the second crystal 13 connector lines 27, 28 are provided here, which can be connected to the first (two-core) connecting line 22 of the noise reducer of FIG. 4. In this manner a high voltage signal is applied to the first crystal 12 and the second crystal 13.

The beam of light 29 exiting the second crystal 13 has a polarization state depending on the applied voltage, on the lengths $L_1$ and $L_2$ of the two crystals 12, 13 and on their temperature. This polarization state can be linear, circular or elliptic. Now, this beam of light 29 strikes a polarizer 14 which reflects the undesirable direction of polarization of the beam of light 29 out of the direction of light propagation LR. In this case, the horizontal direction of polarization (perpendicular to the paper plane) is undesirable and is correspondingly discarded as a beam of light 30 that is reflected out. A modulated beam of light 16 then exits the polarizer 14 in the direction of light propagation LR, its direction of polarization P corresponding to the direction of polarization P of the incident beam of light. Compared to the incident beam of light 10 the modulated beam of light 16 has an altered amplitude, so that the modulated beam of light 16 has a considerably lower amplitude noise than the incident beam of light 10.

With reference to the exemplary embodiments of a noise reducer or an electro-optical modulator shown in FIGS. 4 and 5 the basic physical principles applied in the modulation of the beam of light are subsequently explained. These basic principles are applicable not only to the exemplary embodiments of FIGS. 4 and 5, but also to other noise reducers having an electro-optical modulator in which crystals of different lengths are used. In this respect, the exemplary embodiments of FIGS. 4 and 5 merely serve as an illustration.

When a linearly polarized light source such as for instance the beam of light 10 runs through a birefringent crystal like the first crystal 12, those portions of the light wave which propagate as ordinary and extraordinary partial wave undergo different refraction indices $n_o$ and $n_e$. By inclination of the optical axis of the first crystal 12 by 45° against the direction of polarization of the light source an even division of the light source into an ordinary and an extraordinary portion can be attained. When a voltage U is applied to the metallized z-surfaces of the first crystal 12 standing perpendicular to the optical axis 120 of the first crystal 12, the phase difference between the two partial waves, which is also referred to as delay, can be specified according to the subsequent equation IV:

$$\Gamma = \frac{2\pi L(n_o - n_e)}{\lambda} + \frac{\pi}{\lambda} n_o^3 r_{eff} U \frac{L}{d} \quad \text{(IV)}$$

Here, L denotes the length of the crystal, $\lambda$ the wavelength of the light, $r_{eff}$ the effective electro-optical coefficient depending on the crystal material and on the crystal orientation, U the applied voltage and d the distance of the two electrodes to which the voltage is applied. When, as in the present case, the electrodes are applied onto the z-surfaces of the first crystal 12, d thus also corresponds to the thickness of the crystal.

Depending on the type of crystal and on the arrangement, the aforementioned general equation IV can have slightly different variables. The basic behavior of the delay can, however, be specified by means of the general equation IV independent of the type of crystal and the arrangement of the crystal.

The first term of the general equation IV represents the natural birefringence of the crystal and is not dependent on the voltage applied. However, it is temperature dependent via the refraction indices. The second term represents the birefringence by means of the linear transversal electro-optical effect and, hence, is proportional to the applied voltage U. When now the second crystal 13 with its second length $L_2$ is arranged, rotated by 90°, behind the first crystal 12 with the first length $L_1$, the natural birefringence of the first crystal 12 and of the second crystal 13 partially compensate for each other. For the ordinary wave exiting the first crystal 12 becomes the extraordinary wave in the second crystal 13, while the extraordinary wave exiting the first crystal 12 becomes the ordinary wave in the second crystal 13.

Preferably, the contact surfaces of the two crystals 12, 13 are connected to each other in such a way that the electro-optical terms add up. This is illustrated correspondingly in FIG. 5. Then the result is a total delay according to the subsequent equation V:

$$\Gamma = \frac{2\pi(L_1 - L_2)(n_o - n_e)}{\lambda} + \frac{\pi}{\lambda} n_o^3 r_{eff} U \frac{(L_1 + L_2)}{d} \quad \text{(V)}$$

When now the first term of the equation V is expanded with respect to temperature dependence up to the linear element, the result is the subsequent equation VI:

$$\Gamma = \frac{2\pi(L_1 - L_2)(n_o - n_e)}{\lambda}\left[1 + \left(\frac{\frac{dn_o}{dT} - \frac{dn_e}{dT}}{n_o - n_e} + \alpha\right)\Delta T\right] + \frac{\pi}{\lambda} n_o^3 r_{eff} U \frac{(L_1 + L_2)}{d} \quad \text{(VI)}$$

Here, $dn_o/dT$ and $dn_e/dT$ denote the linear temperature coefficients of the refraction indices and a denotes the linear coefficient of thermal expansion of the crystal material in the direction of light propagation LR. Hence, the total delay is composed of a linearly temperature dependent portion and a linearly voltage dependent portion.

The transmittance of the entire arrangement of the electro-optical modulator 11 having a downstream polarizer 14 is calculated according to the subsequent equation VII:

$$T = \cos^2\left(\frac{\Gamma}{2}\right) \quad \text{(VII)}$$

Transmittance losses due to angle errors, scattering and reflection are neglected here. The transmittance as a function of the voltage applied, calculated in such a way, is illustrated as an example for various temperatures in FIG. 1.

Figure 6:
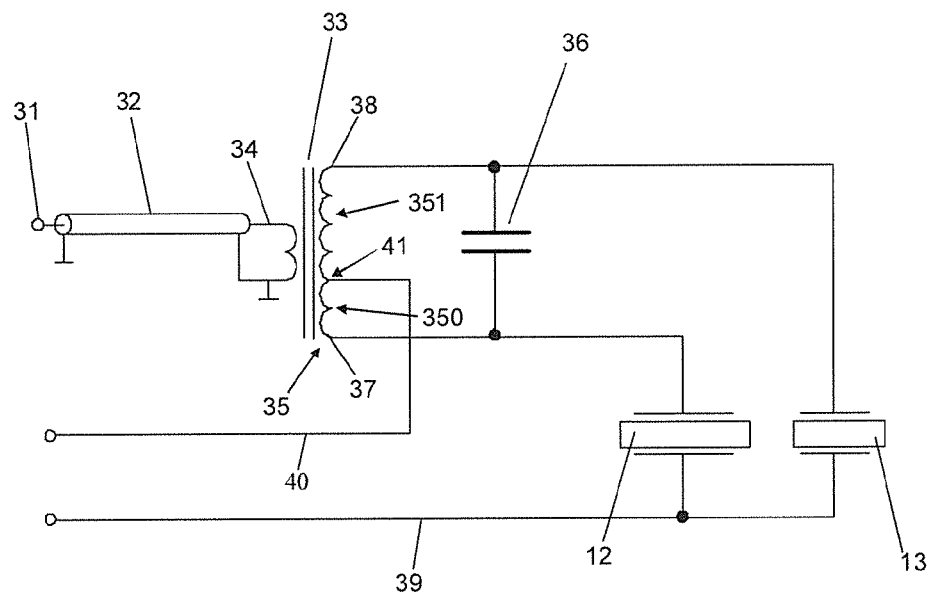
FIG. 6 shows a circuit diagram of an exemplary embodiment of an additional phase modulator.

FIG. 6 shows a circuit diagram for a phase modulation circuit which can be integrated into the specified noise reducer. In this manner it is possible to attain a phase modulation in addition to the amplitude modulation of the beam of light.

For a corresponding phase modulation, a high-frequency AC voltage signal 31 is made available by means of an AC voltage source. This high-frequency AC voltage signal 31 is led into the noise reducer via a coaxial cable 32. The connection to the noise reducer takes place via a high-frequency transformer 33. The coaxial cable 32 is here connected to a primary winding 34 of the high-frequency transformer 33. The high-frequency transformer 33 is preferably equipped with a corresponding impedance matching. A secondary winding 35 of the high-frequency transformer 33 forms an oscillating circuit with a capacitor 36 which is connected in parallel. The oscillating circuit is here adjusted to the frequency of the AC voltage signal 31. By means of the oscillating circuit a resonance peak arises, which is why a low amplitude of the AC voltage signal 31 is sufficient to attain an effective phase modulation of the beam of light radiating through the electro-optical modulator.

The secondary winding 35 has a first end of the winding 37 and a second end of the winding 38. The first end of the winding 37 is connected to an electrode of a first birefringent crystal 12. The second end of the winding 38 is connected to an electrode of a second birefringent crystal 13. The first crystal 12 and the second crystal 13 can for example be the first crystal 12 or the second crystal 13 of the exemplary embodiments of FIG. 4 or 5.

As explained above, the length of the first crystal 12 and the length of the second crystal 13 differ from each other.

The respective counter electrodes of the first crystal 12 and the second crystal 13 are connected to a joint return line 39, which can for example be connected to the first connecting line 22 (compare FIG. 4) of the control circuit of the noise reducer. Moreover, a second core of the first connecting line 22 is connected to the secondary winding 35 of the high-frequency transformer 33 via a line 40. The connection of the line 40 to the secondary winding 35 of the high-frequency transformer 33 takes place here not on the first end of the winding 37 or on the second end of the winding 38, but instead on a tapping 41 which takes place between the first end of the winding 37 and the second end of the winding 38 on the secondary winding 35.

By this tapping 41 the secondary winding 35 is divided into a first partial winding 350 and a second partial winding 351. The position of the tapping 41 here takes place in such a way that the number of turns $w_1$ of the first partial winding 350 and the number of turns $w_2$ of the second partial winding 351 stand inversely proportional to the lengths $L_1$ of the first crystal 12 and $L_2$ of the second crystal 13. That is to say, the tapping 41 takes place on such a point of the secondary winding 35 that the following equation VIII is satisfied:

$$\frac{w_1}{w_2} = \frac{L_2}{L_1} \quad \text{(VIII)}$$

When the numbers of turns $w_1$, $w_2$ of the first partial winding 350 and the second partial winding 351 stand in this ratio to the crystal lengths L2 and L1 of the second crystal 13 and the first crystal 12, the general equation III subsequently expressed once again is satisfied:

$$\frac{U_1}{U_2} = -\frac{L_2}{L_1} \quad \text{(III)}$$

As already explained above, there is then no undesirable amplitude modulation due to the additional phase modulation, so that the amplitude modulation strived for by the noise reducer is not affected.

The invention claimed is:

1. A device for reducing amplitude noise of a light radiation, comprising:
    a first birefringent crystal which has a first length along a direction of light propagation as well as a first optical axis,
    a polarization device,
    a light sensitive element, arranged in such a way that at least a part of a beam of light radiating through the first crystal and the polarization device when the device is in operation strikes the light sensitive element, and
    a control appliance which stands in operative connection with the first crystal and which is provided and arranged for using a signal generated by the light sensitive element as input variable and for applying a voltage signal as output signal to the first crystal to compensate for the amplitude noise,
    wherein for the temperature control of the first crystal a temperature control appliance is provided which stands in operative connection with the control appliance and which is provided and arranged for using the voltage signal of the control appliance as input variable and for setting the temperature of the first crystal depending on the input variable of the temperature control appliance.

2. The device according to claim 1, wherein a second birefringent crystal is provided which has a second length along the direction of light propagation as well as a second optical axis and which is arranged in front of the polarization device in the direction of light propagation, wherein the second length differs from the first length.

3. The device according to claim 2, wherein the control appliance also stands in operative connection with the second crystal and the temperature control appliance is also provided to control the temperature of the second crystal to, when in operation, also set the temperature of the second crystal depending on the input variable of the temperature control appliance.

4. The device according to claim 3, wherein no further birefringent crystal is present and in that the temperature control appliance is provided to control the temperature of the first crystal and of the second crystal.

5. The device according to claim 2, wherein in the optical path in front of the polarization device at least one further birefringent crystal is provided.

6. The device according to claim 1, wherein the temperature control appliance is provided and arranged for the purpose of setting the temperature of the first crystal and/or of the second crystal, when the device is in operation, in such a way that the voltage signal of the control appliance averages out at zero over time.

7. The device according to claim 1, wherein the first crystal and/or the second crystal have electrodes, provided and arranged for establishing the operative connection with the control appliance.

8. The device according to claim 7, wherein the electrodes are in each case designed as a metal coating, arranged on those surfaces of the crystals that are arranged perpendicular to the first optical axis or perpendicular to the second optical axis.

9. The device according to claim 1, wherein the first optical axis and/or the second optical axis are aligned perpendicular to the direction of light propagation.

10. The device according to claim 1, wherein the first optical axis and/or the second optical axis are aligned at an angle of more than 0° to less than 90° to a polarization direction of a beam of light radiating through the device when in operation.

11. The device according to claim 2, wherein the first optical axis is essentially aligned perpendicular to the second optical axis.

12. The device according to claim 2, wherein the first length and the second length differ from each other by more than 0.2 mm.

13. The device according to claim 2, wherein the device additionally has an AC voltage source, provided and arranged for a phase modulation of a beam of light radiating through the device when in operation, wherein the AC voltage source stands in operative connection with the first crystal and the second crystal in such a way that, when in operation, an AC voltage signal produced by the AC voltage source is fed into the second crystal, in antiphase compared to the first crystal.

14. The device according to claim 13, wherein the AC voltage source is connected to a primary winding of a transformer, wherein a secondary winding of the transformer forms an oscillating circuit with a capacitor and is connected to the first crystal and the second crystal.

15. The device according to claim 13, wherein the AC voltage source is connected to the first crystal and the second crystal in such a way that the quotient from the amount of the amplitude of the AC voltage signal applied to the first crystal when in operation and the amount of the amplitude of the AC voltage signal applied to the second crystal when in operation is proportional to the quotient from the second length and the first length.

16. A method for reducing amplitude noise of a light radiation, comprising the following steps:
    radiating a light radiation in a direction of light propagation onto a device for reducing amplitude noise, particularly according to claim 1, wherein the light radiation
        first radiates through a first birefringent crystal, having a first length along the direction of light propagation as well as a first optical axis,
        thereafter radiates through a polarization device, and
        thereafter at least partly strikes a light sensitive element,
    producing a signal by means of the light sensitive element, which said signal depends on the amplitude of the light radiation striking the light sensitive element,
    using the signal produced by means of the light sensitive element as input variable of a control appliance,
    modifying the signal by means of the control appliance,
    applying the modified signal to the first crystal,
    determining a desired transmittance of the device for reducing amplitude noise as operating point,
    setting the temperature of the first crystal by means of a temperature control appliance to such a temperature at which the voltage required to attain the transmittance determined as operating point essentially amounts to 0 volt, and
    controlling the temperature control appliance depending on the voltage of the modified signal, which is applied to the first crystal, in such a way that the voltage required to attain the transmittance determined as operating point essentially amounts to 0 volt on average over time.

17. The method according to claim 16, wherein the beam of light, prior to radiating through the polarization device, radiates through a second crystal, in that the modified signal is also applied to the second crystal, in that the temperature of the second crystal is also set and in that the temperature control appliance is controlled depending on the voltage of the modified signal applied to the first crystal and to the second crystal.

18. The method according to claim 16, wherein controlling the temperature control appliance takes place in such a way that the temperature of the first crystal and/or of the second crystal is modified to bring the voltage required to attain the transmittance determined as operating point to a value, the absolute value of which corresponds to the voltage of the modified signal but has a reversed sign.

19. The method according to claim 16, wherein additionally a phase modulation of the beam of light radiating through the device takes place.

20. The method according to claim 19, wherein the phase modulation is essentially executed without an amplitude modulation of the beam of light.

21. The method according to claim 19, wherein an AC voltage signal used for the phase modulation is fed into the second crystal, in antiphase compared to the first crystal.

* * * * *